US012687208B2

(12) United States Patent
Ravindranath

(10) Patent No.: US 12,687,208 B2
(45) Date of Patent: Jul. 21, 2026

(54) THERMAL MANAGEMENT DEVICE

(71) Applicant: Transportation IP Holdings, LLC,
Norwalk, CT (US)

(72) Inventor: Balaji Hosadurgam Ravindranath,
Mysore (IN)

(73) Assignee: Transportation IP Holdings, LLC,
Norwalk, CT (US)

( * ) Notice: Subject to any disclaimer, the term of this
patent is extended or adjusted under 35
U.S.C. 154(b) by 457 days.

(21) Appl. No.: 18/307,705

(22) Filed: Apr. 26, 2023

(65) Prior Publication Data

US 2023/0392658 A1      Dec. 7, 2023

Related U.S. Application Data

(60) Provisional application No. 63/349,860, filed on Jun.
7, 2022.

(51) Int. Cl.
*F16D 65/12*          (2006.01)
*F16D 65/02*          (2006.01)

(52) U.S. Cl.
CPC ......... *F16D 65/128* (2013.01); *F16D 65/125*
(2013.01); *F16D 2065/1332* (2013.01)

(58) Field of Classification Search
CPC .............................................. F16D 2065/1332
USPC ........................ 188/218 XL, 264 A, 264 AA
See application file for complete search history.

(56) References Cited

U.S. PATENT DOCUMENTS 3,899,054 A      8/1975 Huntress et al.
9,309,939 B2      4/2016 Hentrich et al.

9,856,934 B2 *      1/2018 Peck ..................... F16D 65/128
11,773,935 B2 *      10/2023 Ravindranath ......... F16D 65/78
                                                                          188/218 XL
2009/0057077 A1 *      3/2009 Mears .................. F16D 65/128
                                                                          188/218 XL
2010/0258394 A1      10/2010 Hanna
2018/0163802 A1      6/2018 Boffelli

FOREIGN PATENT DOCUMENTS

CN          110159680 A          8/2019
DE          3152498 A1          6/1983
DE          10055768 A1          5/2002
EP          2208908 A1          7/2010
EP          3495684 A1          6/2019
WO          2005116476 A2          1/2006
WO          WO-2013145427 A1 *      10/2013      ............. F16D 65/12
WO          2020172169 A1          8/2020

OTHER PUBLICATIONS

Partial European Search Report received for related EP Pat. App.
No. 23175952.3 dated Aug. 31, 2023 (11 pages).
Extended European Search Report received for related EP Pat. App.
No. 23175952 dated Dec. 1, 2023 (10 pages).

* cited by examiner

*Primary Examiner* — Christopher P Schwartz
(74) *Attorney, Agent, or Firm* — K&L Gates LLP

(57)          ABSTRACT

A thermal management device and method implemented by
the same that includes plural blades configured to be dis-
posed between a brake disc and a wheel hub, the blades
circumferentially spaced apart from each other around the
wheel hub, the blades one or more of positioned or shaped
to increase an airflow from outside of the brake disc and the
vehicle wheel to locations between the brake disc and the
vehicle wheel relative to the blades not being positioned
between the brake disc and the wheel hub.

12 Claims, 8 Drawing Sheets

THERMAL MANAGEMENT DEVICE

CROSS-REFERENCE TO RELATED APPLICATIONS

This application claims priority to U.S. Provisional Patent Application No. 63/349,860, which was filed on 7 Jun. 2022, and the entire disclosure of which is incorporated herein by reference.

BACKGROUND

Technical Field

The subject matter described herein relates to devices used to brake or to decelerate (e.g., slow or stop movement) objects or equipment, such as one or more wheels of a vehicle.

Discussion of Art

Different types of brake assemblies may slow or stop movement of objects (such as wheels) by applying a force that counteracts the movement of the objects. For example, friction brakes may include friction surfaces of a brake disc that engage a moving (e.g., rotating) part of a wheel to slow or stop the wheel. Heat generated by the brake disc and wheel, however, may need to be managed. For example, the heat generated by friction between the brake disc and the wheel may need to be directed out of the brake disc and/or the interface between the brake disc and the wheel to avoid thermally damaging the brake disc. A need may exist for improved brake assemblies that better handle the heat generated by operation of the brake disc, such as by transferring the heat out of the brake disc and dissipating the heat to the surrounding environment.

A similar alternate application to that of a brake disc can be a Drum brake. In a Drum brake, a friction pad (often referred to as brake pad) engages against a rotating drum which is coupled with the wheels of a vehicle. This engagement results in heating of both the drum and the brake pad, which must be thermally managed, and the heat removed. Yet another alternate application in the rail industry is called a Tread brake, where a brake shoe engages with the rotating wheel of a rail vehicle. Numerous other types of deceleration devices, termed as brakes, are in use, depending on the requirements and constraints of the equipment that needs to be controlled.

BRIEF DESCRIPTION

In one or more embodiments, a thermal management device may include plural blades configured to be disposed between a brake disc and a wheel hub. The blades may be circumferentially spaced apart from each other around the wheel hub. The blades are positioned and/or shaped to increase an airflow around the brake disc and the vehicle wheel to locations between the brake disc and the vehicle wheel relative to the blades not being positioned between the brake disc and the wheel hub.

In one or more embodiments, a thermal management device may include a brake disc having a body that includes a wheel-facing surface and an opposite surface. The wheel-facing surface includes protruding fins positioned to engage a vehicle wheel between a wheel hub and an outer circumferential surface of the vehicle wheel that engages a surface on which the vehicle wheel rolls. In addition, (a) the body of the brake disc may be formed from a first material with the protruding fins formed from a different, second material; (b) the body of the brake disc may be formed from the first material and the body may include one or more body inserts formed from a third material; (c) the protruding fins may be formed from the second material and the protruding fins may include one or more fin inserts formed from the third material; (d) the body of the brake disc may be formed from the first material and the body may include the one or more body inserts with the protruding fins formed from the second material, the protruding fins include one or more fin inserts, and the one or more body inserts and the one or more fin inserts are formed from the third material; (e) the body of the brake disc may be formed from the first material and the body includes the one or more body inserts formed from the third material, the protruding fins may be formed from the second material and the protruding fins include the one or more fin inserts formed from a fourth material, and the first material, the second material, the third material, and the fourth material are different materials; and/or (f) the body of the vehicle wheel may be formed from the first material and the body includes the one or more wheel inserts formed from a sixth material, the protruding fins are formed from the second material and the protruding fins include the one or more fin inserts formed from a fifth material, the body of the brake disc is formed from the third material and include inserts formed from a fourth material, and the first material, the second material, the third material, the fourth material, the fifth material and the sixth material are different materials.

In one or more embodiments, a method may include coupling plural blades with one or both of a brake disc or a wheel hub. The blades may be coupled with the one or both of the brake disc or the wheel hub with the blades circumferentially spaced apart from each other around the wheel hub. The blades may also be coupled with the one or both of the brake disc or the wheel hub with the blades one or more of positioned or shaped to increase an airflow from outside of the brake disc and the vehicle wheel to locations between the brake disc and the vehicle wheel relative to the blades not being positioned between the brake disc and the wheel hub.

DETAILED DESCRIPTION

Figure 1:
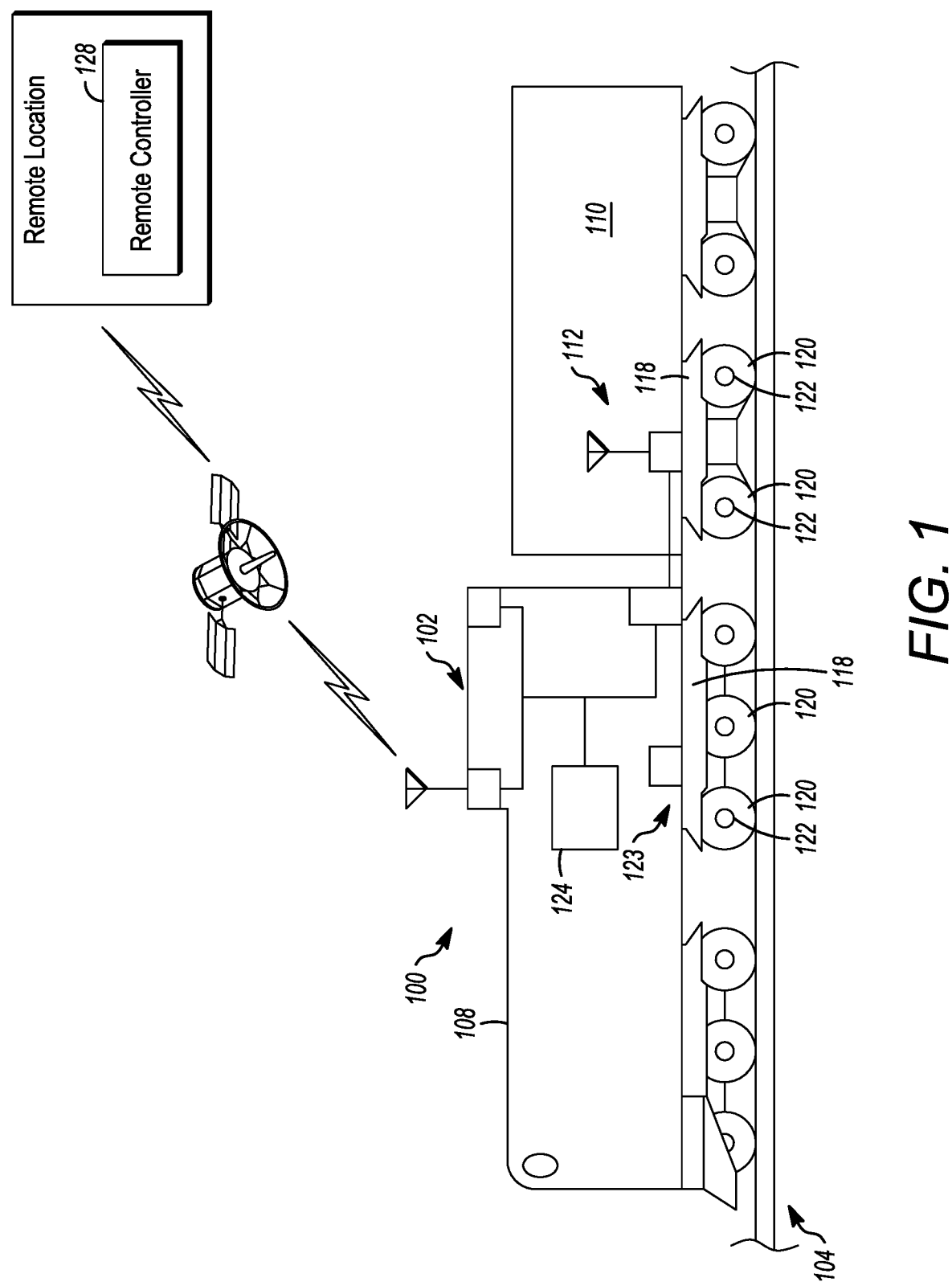
FIG. 1 illustrates a schematic diagram of a vehicle system.

Embodiments of the subject matter described herein relate to thermal management devices that improve heat management or thermal behavior of a braking device of a vehicle to increase the rate at which thermal energy (e.g., heat) is transferred out of the thermal management devices and dissipated to the atmosphere (relative to other known thermal management devices). The braking device may be provided to provide deceleration of the vehicle by utilizing friction forces that produce heat. Improving the rate of heat dissipation from a thermal management device can increase the useful life of the thermal management device and thereby increase the safety of the vehicle(s) using the thermal management devices. One manner of improving (e.g., increasing) the rate of transfer of the heat from a thermal management device can include adding or including geometric features to the thermal management device, where these features direct the flow of air or other coolant over and/or through the thermal management device. For example, the geometric features can have shapes of fins or blades that blow or compress air from outside of the thermal management device toward and/or into the thermal management device. This can increase the rate at which heat is transferred away and/or out of the thermal management device (relative to thermal management devices not having the geometric features). Optionally, one or more external devices can direct air into and/or around the thermal management device, such as a source of compressed air (e.g., a compressor) and/or a blower that flushes the thermal management device with air to cool the thermal management device.

The geometric airflow features can be provided in the form of blades in a wheel hub of the thermal management device, such as a bladed wheel hub of a brake disc. The wheel hub can be integrally formed with the thermal management device, such as by creating the wheel hub from the same body of one or more materials forming the thermal management device, or may be separately formed from the thermal management device and later combined with the thermal management device. In one embodiment, the thermal management device is or includes a brake disc that contacts a wheel surface to brake the wheel. Alternatively, the thermal management device may be or may include a brake shoe that contacts another wheel surface to decelerate the wheel.

Another example, a thermal management device is provided having a composite structure that houses a base friction material (e.g., cast iron or another material) that forms part of the thermal management device (e.g., a brake disc or brake shoe), with a heat transfer path formed in the thermal management device from another material. This other material may be more thermally conductive than the base material. For example, the friction material that contacts the wheel may be formed from a first material that is less thermally conductive (e.g., iron, steel, or cast iron) than a second material and the heat transfer path can be formed from a second material that is more thermally conductive, such as copper or a copper alloy. The second material may be more thermally conductive by at least a threshold amount to exclude materials that are only slightly more thermally conductive than the first material. For example, the second material may be at least ten times, at least one hundred times, or at least a thousand times more thermally conductive than the first material in different embodiments.

FIG. 1 illustrates a schematic diagram of one example of a vehicle system 100. While FIG. 1 illustrates the vehicle system as a rail vehicle, in other examples the vehicle system can include automobiles, marine vessels, airplanes, off road vehicle, construction vehicles, industrial equipment, agricultural vehicles, and other fleet vehicles. A suitable vehicle system may include a single vehicle or plural vehicles. The vehicle system may travel along a route 104 on a trip from a starting or departure location to a destination or arrival location. In the illustrated example, the vehicle system may include a propulsion-generating vehicle 108 and a non-propulsion-generating vehicle 110 that are mechanically interconnected to one another to travel together along the route. In this example, the vehicle system may include at least one propulsion-generating vehicle and optionally, one or more non-propulsion-generating vehicles. Alternatively, the vehicle system may be formed of only a single propulsion-generating vehicle or plural propulsion-generating vehicles that travel in a coordinated manner.

The propulsion-generating vehicle may generate tractive efforts to propel (for example, pull or push) the vehicle system along routes. The propulsion-generating vehicle may include a propulsion system, such as an engine, one or more traction motors, and/or the like, that operate to generate tractive effort to propel the vehicle system. Although one propulsion-generating vehicle and one non-propulsion-generating vehicle are shown in FIG. 1, the vehicle system may include multiple propulsion-generating vehicles and/or multiple non-propulsion-generating vehicles. In an alternative embodiment, the vehicle system only may include the propulsion-generating vehicle such that the propulsion-generating vehicle is not coupled to the non-propulsion-generating vehicle or another kind of vehicle. In yet another embodiment, the vehicles in the vehicle system are logically or virtually coupled together, but not mechanically coupled together. For example, the vehicles may communicate with each other to coordinate their movements so that the vehicles move together as a virtual block—a convoy, consist, swarm, fleet, platoon, or the like—without the vehicles being physically coupled with each other by couplers or any other physical means.

The propulsion-generating vehicle may include one or more other operating systems 112 that control the operation of the vehicle system. In one example, the operating system is a braking system that generates braking effort to slow or stop movement of the vehicle system. Alternatively, the operating system may be a heating and cooling system, engine and/or transmission system, a bearing system, a wheel system, or the like.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. In one embodiment, the vehicle system may not include axles, such as in some mining vehicles, electric vehicles, automobiles, etc. Optionally, the axle may selectively contact the stationary surface like rails, ground, pathways, or the like.

Each vehicle of the vehicle system may include a brake assembly 123. The brake assembly may include a thermal management device that includes a brake disc that is coupled to an axle, wheel, etc. to apply frictional force for stopping or decelerating the vehicles. The braking assembly may include the brake disc that includes either fins disposed around the wheel hub of the wheel for cooling and heat dissipation, and/or may include for blades, also for cooling and braking purposes.

The vehicle system may include a vehicle controller 124 that may further include a wireless communication system

126 that allows wireless communications between vehicles in the vehicle system and/or with remote locations, such as a prescription controller 128. The communication system may include a receiver and a transmitter, or a transceiver that performs both receiving and transmitting functions. The communication system may include an antenna and associated circuitry.

Figure 2:
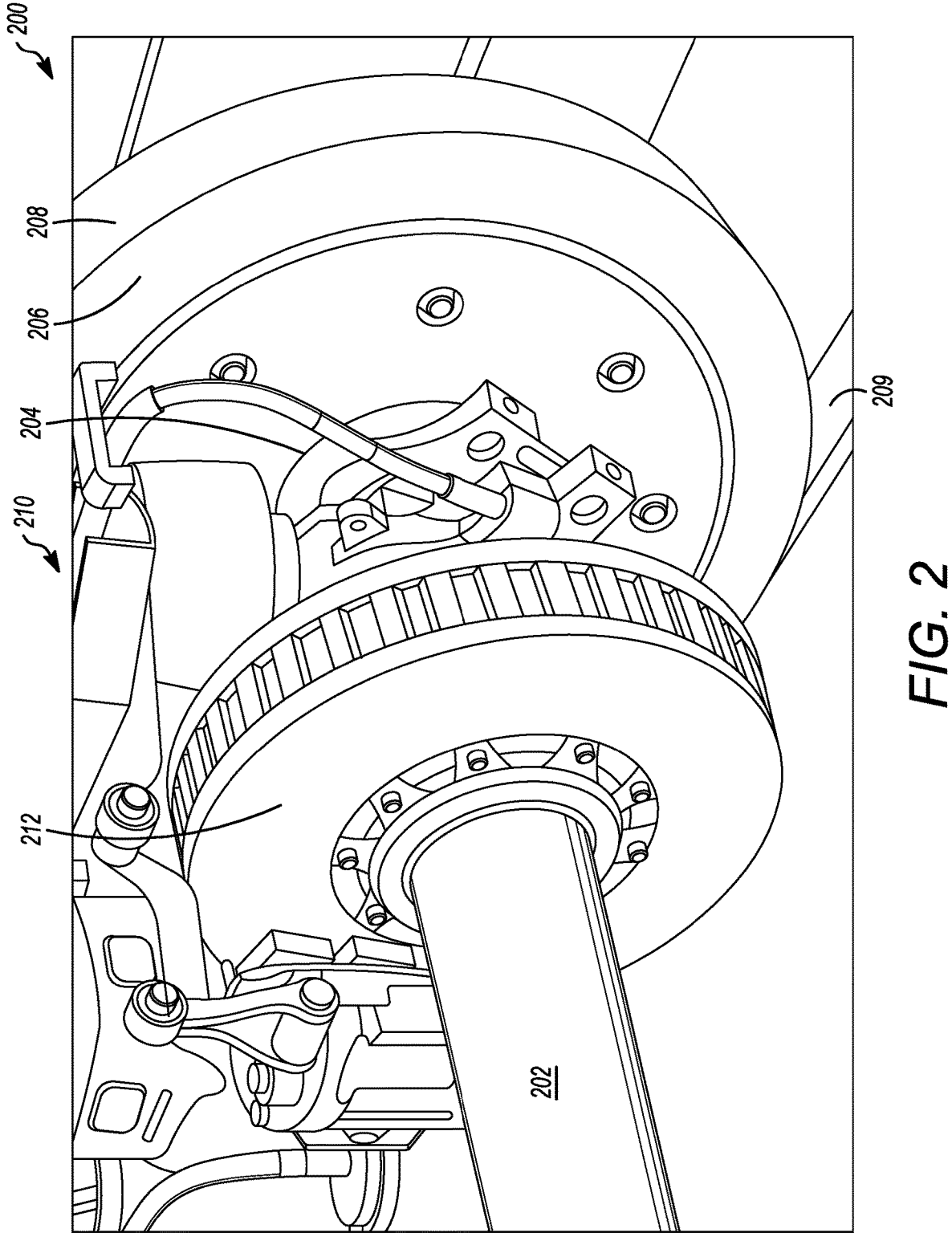
FIG. 2 illustrates a side perspective view of a wheel assembly and braking assembly.

FIG. 2 illustrates a brake assembly 200 that may be utilized for a vehicle, including a vehicle of a vehicle system. In one example the vehicle system may be the vehicle system illustrated in FIG. 1. The brake assembly may include an axle 202 that may be secured to a wheel hub 204 of a wheel 206 that has an outer surface 208 radially spaced from the wheel hub for engaging a route 209. In one example, the route may include or be a track.

The brake assembly may also include a thermal management device 210. The thermal management device may include a brake disc 212 that engages the wheel, or is engaged to provide frictional braking for the wheel. In the example of FIG. 2 the brake disc is coupled to the axle and includes a first side and second side that are not separate and include crevices therebetween. The crevices are provided between the friction rings through which the air flows. In particular, the fins or blades may be disposed around a radially inner surface of the brake disc and positioned or shaped to increase an airflow from outside of the brake disc to locations by the brake disc relative to the blades not being positioned around the radially inner surface of the brake disc. In this manner, the airflow more efficiently conveys heat from the brake disc. In one example, as illustrated in FIG. 2, the brake disc may couple to the axle at the radially inner surface. Still, the blades function to improve heat transfer and prevent wear on the brake disc.

Figure 3:
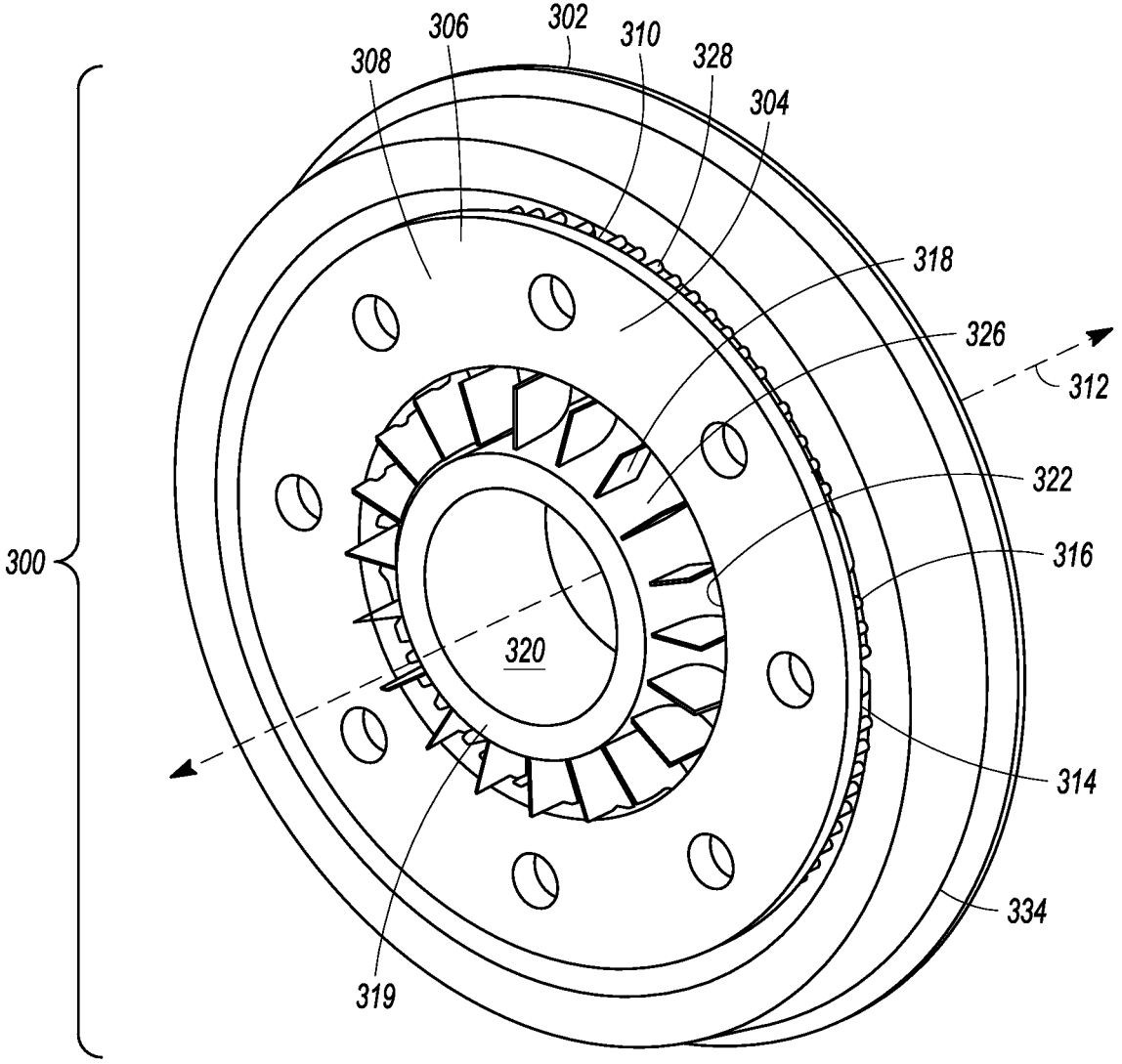
FIG. 3 illustrates a side perspective view of a thermal management device.
Figure 4A:
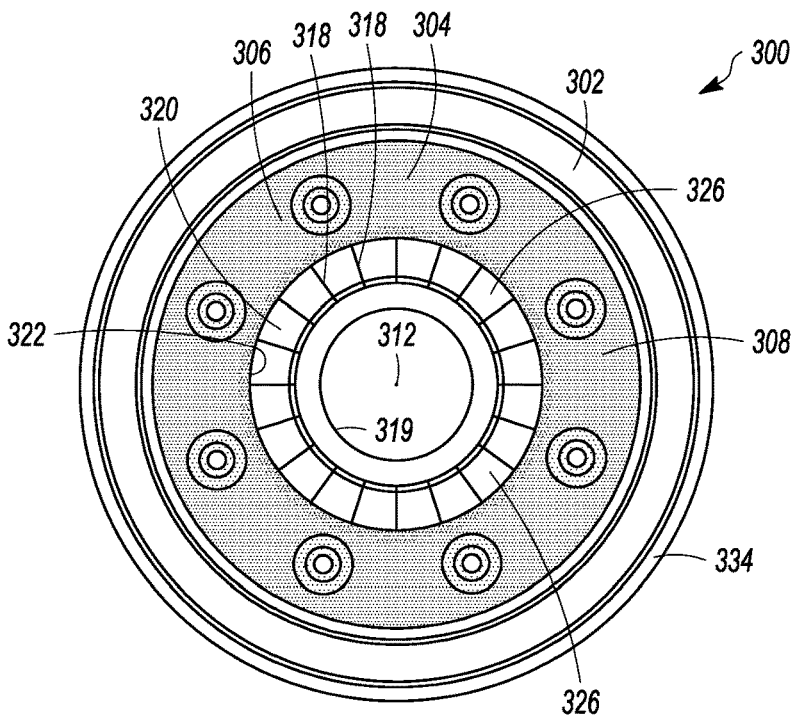
FIG. 4A illustrates a side view of a brake disc.
Figure 4B:
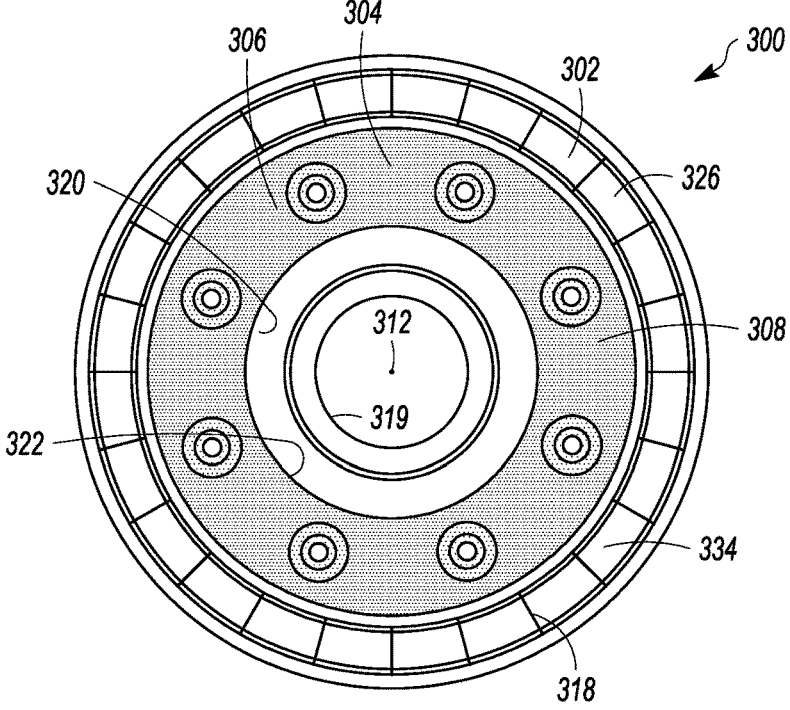
FIG. 4B illustrates a side view of a brake disc.

FIGS. 3-4B illustrate one example of a thermal management device 300. In one example the thermal management device may be part of a brake assembly. In another example the thermal management device may be the thermal management device illustrated in FIG. 2. The thermal management device can be used to engage a wheel 302, an axle, or other moving (rotating or otherwise) part of a system to slow or stop movement of the system. For example, the thermal management device can be a brake disc or a brake shoe that engages a wheel of the vehicle or an axle (e.g., via wheels or rings on the axle) to slow or stop rotation of the wheel or axle.

The thermal management device includes a brake disc 304 with a body 306 having opposite axial surfaces 308, 310. The body may be oriented transverse to a center axis 312 of a wheel hub. One of the axial surfaces includes a wheel engaging surface 314 that moves toward an axial wheel braking surface 316 of the wheel to engage the braking surface (and slow or stop rotation of the wheel about or around the center axis of the wheel.

The brake disc may be mechanically attached and secured to the wheel. In one example fasteners, such as bolts may be utilized to provide the mechanical attachment. While not illustrated, a second brake disc may also be provided on the distal, or opposite side of the wheel. The brake disc rotates with the wheel and axle, having the same angular velocity of the wheel and axle. This arrangement is considered a wheel mounted brake disc. In one example, a brake pad (not shown) may be housed inside a caliper arrangement (not shown) and is actuated by an actuating device such as a hydraulic device, pneumatic device, electrical device, or the like that engages the braking surface to decelerate both the brake disc and wheel together. The friction between the brake pad and the brake disc heads both the brake pad and the brake disc, where the heat of the brake disc is dissipated to the atmosphere through the thermal management device.

In the illustrated example, the thermal management device includes plural blades 318. In one example, the blade may be disposed between the brake disc and the wheel hub 319 of the vehicle wheel within a crevice 320 to dissipate the heat from the brake disc (FIGS. 3 and 4A). In particular, the blades extend throughout a length of a crevice between the vehicle wheel and the brake disc. These blades may radially extend from the wheel hub to or toward a radially inner surface 322 of the brake disc that faces the wheel hub. The blades may be spaced with gaps 326 therebetween. In one example, the blades may contact one or both of the radially inner surface of the brake disc or a radially outer surface of the wheel hub. In another example, the blades may contact only one of a radially inner surface of the brake disc or a radially outer surface of the wheel hub. In another example, the blades may be disposed between an out rim of the brake disc and the inner surface of the wheel (FIG. 4B). In another example, the blades may rotate at a first rotational speed that is different compared to a second rotational speed of the brake disc, or an axle. In addition, the blades may rotate at a different speed or in a different direction.

Figure 5:
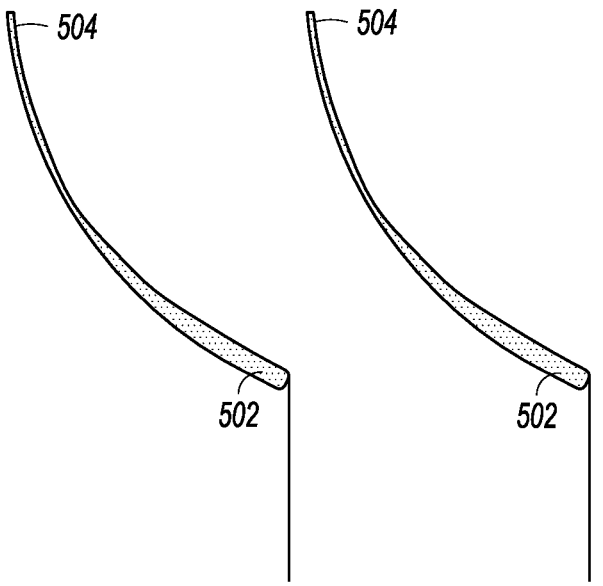
FIG. 5 illustrates a blade to blade view of a thermal management device in one orientation.
Figure 6:
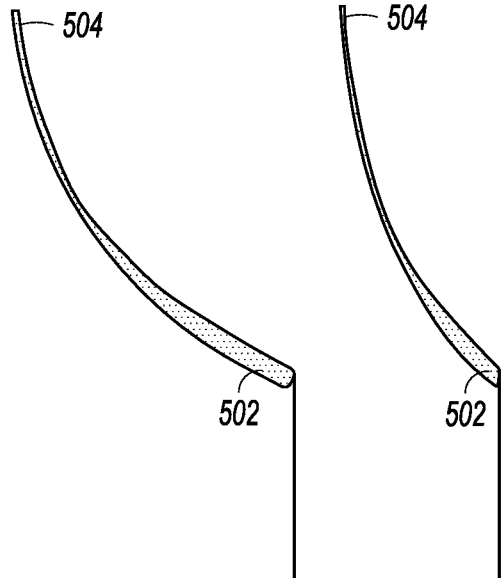
FIG. 6 illustrates a blade to blade view of thermal management device in another orientation.

FIGS. 5 and 6 illustrate different blades 500 that may be utilized in association with a thermal management device. In one example the blades extend from the base 502 and taper to a tip 504 where the base may have a greater thickness or diameter than the tip. Each fin also includes a first side and a second side, where the first side may be a suction side, while the second side may be pressure side. The fins may be uniformly spaced from one another in one example (FIG. 5), or alternatively the fins may be biased near the wheel hub (FIG. 6).

The blades can be circumferentially spaced apart from each other around the wheel hub. In one example, the blades may be circumferentially spaced apart from each other by a common circumferential distance around the wheel hub. Alternatively, the blades may be circumferentially spaced apart from each other by different circumferential distances around the wheel hub. The blades may be planar and/or thin bodies that are spaced apart from each other by gaps along a ring that is parallel to the outer circumference of the wheel hub and/or the outer surface of the wheel. In this manner, the blades are positioned and shaped to increase an airflow from outside the brake disc and the vehicle wheel to locations between the brake disc and the vehicle wheel relative to the blades not being positioned between the brake disc and the wheel hub.

The blades may be positioned and/or shaped to increase an airflow from outside of the brake disc and the vehicle wheel to locations between the brake disc and the vehicle wheel relative to the blades not being positioned between the brake disc and the wheel hub. For example, the blades may operate similar to blades of a fan (e.g., a blower fan) and/or compressor to draw, direct, and/or compress airflow from outside of the thermal management device and wheel to locations between the wheel braking surface of the wheel and the wheel engaging surface of the thermal management device.

In one example, the blades may have planar bodies oriented at angles that intersect each other at a center of the wheel hub. Alternatively, the blades are planar bodies oriented along radial planes that radially extend from a center axis of the wheel hub. In yet another example, the blades are planar bodies oriented along transverse planes that may be transverse to the center axis of the wheel hub. In another embodiment, the blades may be planar bodies oriented along planes that are oriented at different angles relative to the center axis of the wheel hub. In yet another example embodiment, the blades are non-planar bodies. The blade may also have different thicknesses, or may have a thickness that varies along a length of the one or more blades. In an example, the blades may be biased toward each other between pressure sides and suction sides of the blades.

In one example, the blades may be formed from a different material than the vehicle wheel. In one such example the brake disc may be formed from a substrate material having a lower thermal conductivity than the blades, friction surfaces, etc. that require more heat transfer. In an example, the composite material having the lower thermal conductivity may be steel, cast iron, or the like. Alternatively, the blades and the vehicle wheel are formed from a common material. In one example, the plural blades of the brake disc may be formed from a first material while the body of the brake disc may be formed from a second material that is different from the first material.

With reference back to FIGS. 3-4B, the wheel may include the wheel hub that extends along and encircles the axis of rotation, and an outer surface 334 that is radially spaced apart from the central wheel hub. This outer surface can be the surface of the wheel that engages the route, track, or other surface on which the vehicle is moving. An axle can directly or indirectly couple with the wheel through or via the wheel hub of the wheel. The brake disc may be radially disposed between the wheel hub and the outer surface of the wheel, as shown in FIG. 3.

The wheel can be a component of a vehicle that contacts a surface along which the vehicle is moving, or can be a radially extended component of or attached to an axle (e.g., an axle wheel or axle ring), where contact between the wheel engaging surface of the thermal management device and the wheel braking surface slows or stops rotation of the axle wheel or axle ring, thereby slowing or stopping rotation of the wheel(s) contacted to the axle and that engage the surface on which the vehicle is moving. The opposite axial surface of the thermal management device includes an opposite axial surface that faces away from the wheel braking surface and the wheel.

Figure 7:
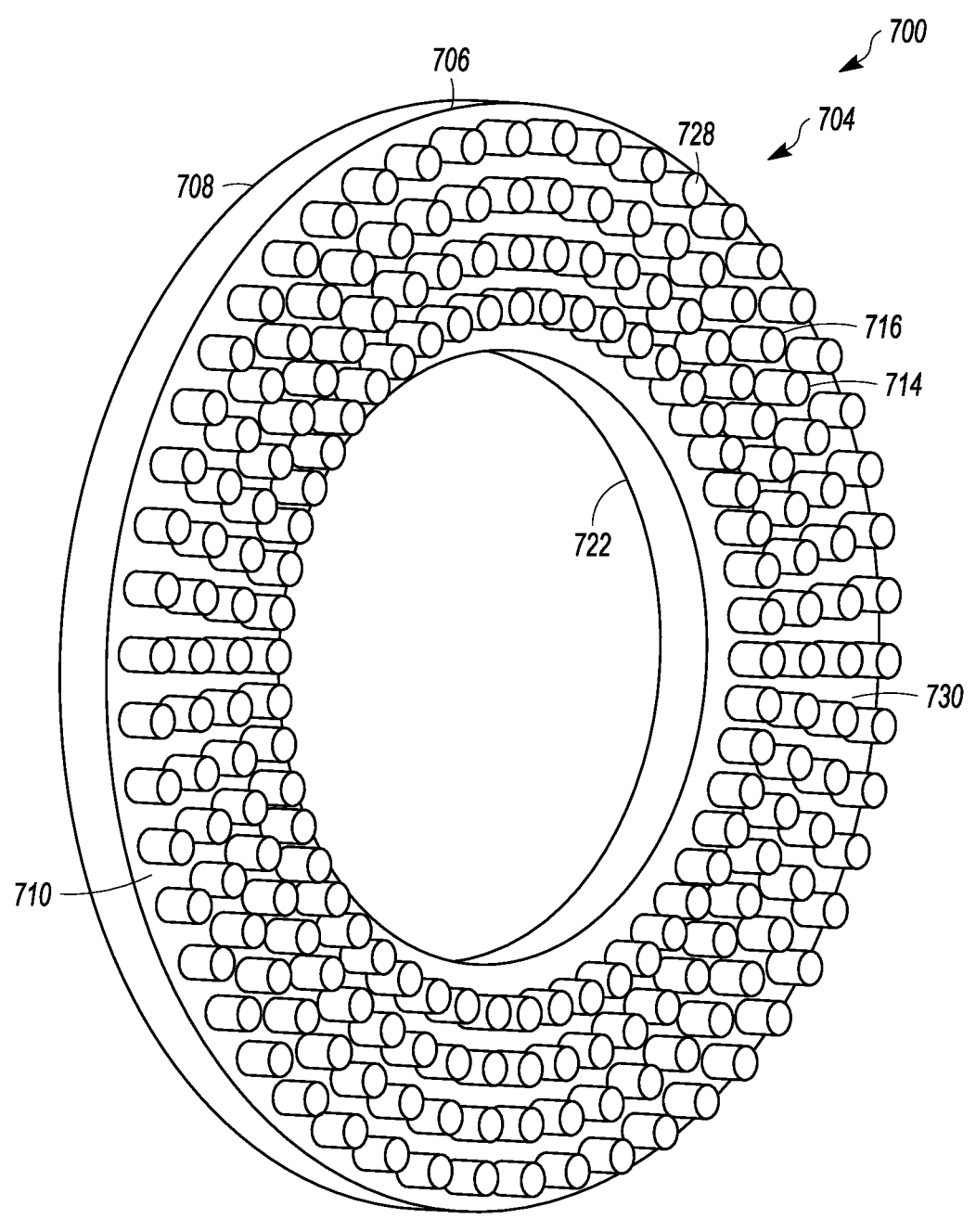
FIG. 7 illustrates an inward side perspective view of a thermal management device.
Figure 8:
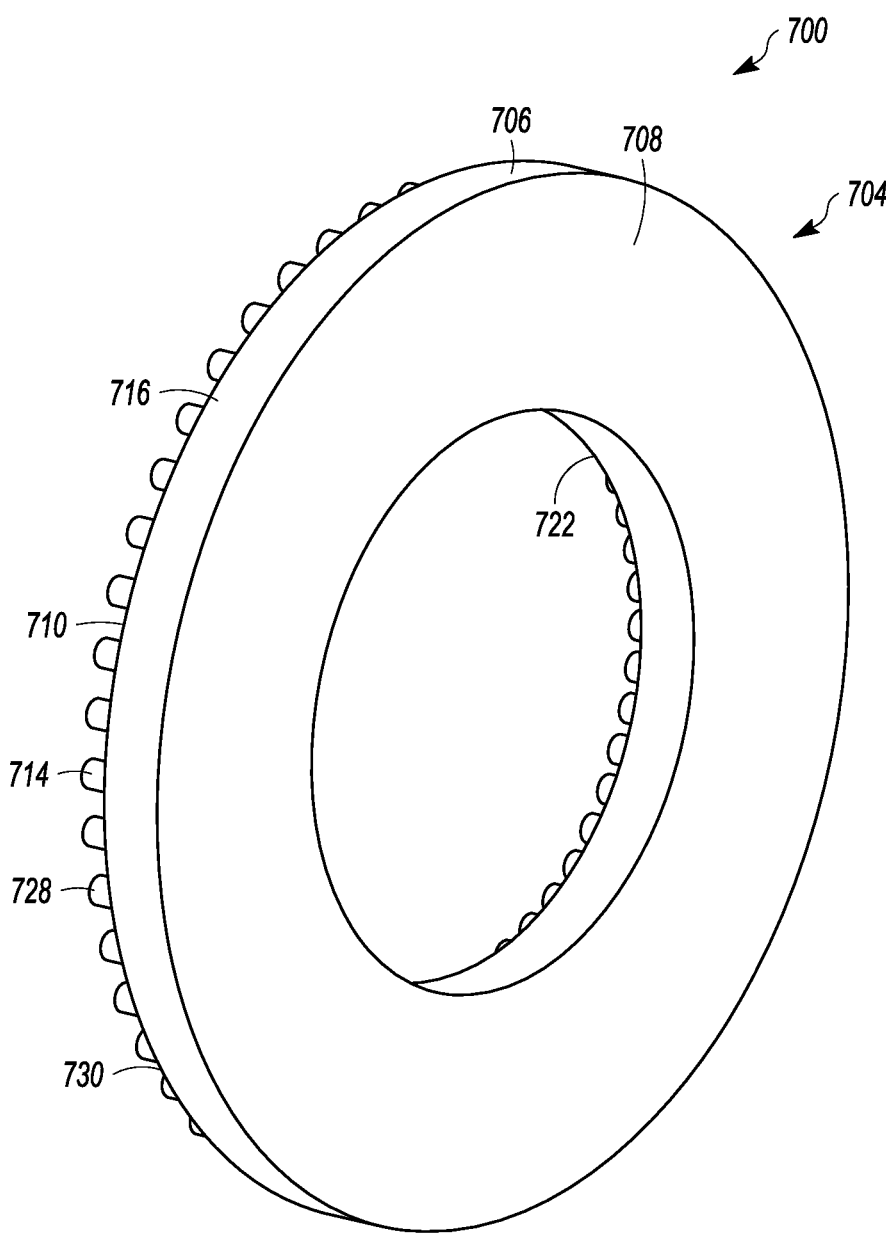
FIG. 8 illustrates a side perspective view of a thermal management device.

FIGS. 7-8 illustrates another example embodiment of a thermal management device 700. The thermal management device similar to the thermal management device of FIGS. 3-4 includes a brake disc 704 with a body 706 having opposite axial surfaces 708, 710. The body may be oriented transverse to a center axis of a wheel hub (not shown). One of the axial surfaces includes a wheel engaging surface 714 that moves toward an axial wheel braking surface of the wheel to engage the braking surface, and decelerate or stop rotation of the wheel about or around the center axis of the wheel.

In one example, the brake disc may also include protruding fins 728 that face an axially oriented brake surface of the wheel. The protruding fins are provided to increase the surface area for dissipating heat into the environment from the brake disc. The protruding fins of the brake disc may be formed from a first material, while the body of the brake disc may be formed from a second material that is different from the first material. In one example, one or both of the body or the protruding fins of the brake disc may include an insert 730 formed from an insert material that differs from one or both of the first material of the protruding fins of the brake disc or the second material of the body of the brake disc. In an example, the body of the brake disc, and the vehicle wheel may include inserts formed from an insert material that differs from the first material of the protruding fins, the second material of the brake disc and a third material of the vehicle wheel.

In one embodiment, the axial surfaces of the body of the brake disc may be a wheel-facing surface and an opposite surface. The wheel-facing surface may include the protruding fins positioned to engage the vehicle wheel between a wheel hub and an outer circumferential surface of the vehicle wheel that engages a surface on which the vehicle wheel roll. In one example, the body of the brake disc may be formed from a first material, and the protruding fins may be formed from a second material where the first material is different from the second material. In another example, the body of the brake disc may be formed from the first material and the body may include one or more body inserts formed from a third material. In yet another example, the protruding fins may be formed from the second material and the protruding fins may include one or more fin inserts formed from the third material. Alternatively, the body of the brake disc may be formed from the first material and the body may include the one or more body inserts. The protruding fins may be formed from the second material and the protruding fins also include the one or more fin inserts. Meanwhile, the one or more body inserts, and the one or more fin inserts may be formed from the third material. In another embodiment, the body of the brake disc may be formed from the first material and the body may include the one or more body inserts formed from the third material. The protruding fins may be formed from the second material and the protruding fins may include the one or more fin inserts formed from a fourth material, and the first material, the second material, the third material, and the fourth material may different materials. In yet another example, the body of the vehicle wheel may be formed from the first material and the body may include the one or more wheel inserts formed from a sixth material. The protruding fins may be formed from the second material and the protruding fins may include the one or more fin inserts formed from a fifth material, where the body of the brake disc is formed from the third material and may include inserts formed from a fourth material. In such an embodiment, the first material, the second material, the third material, the fourth material, the fifth material and the sixth material may all be different materials.

In one example, the brake disc may be mounted to a shaft connected with the vehicle wheel, and the brake disc may include opposing plates with the protruding fins disposed between the plates. In one example, the blades may be separate from one or both of the brake disc and a shaft coupled with the vehicle wheel such that the blades can rotate around the shaft or relative to the vehicle wheel at a first rotational speed that differs from a second rotational speed at which the brake disc or the shaft rotates.

Figure 9:
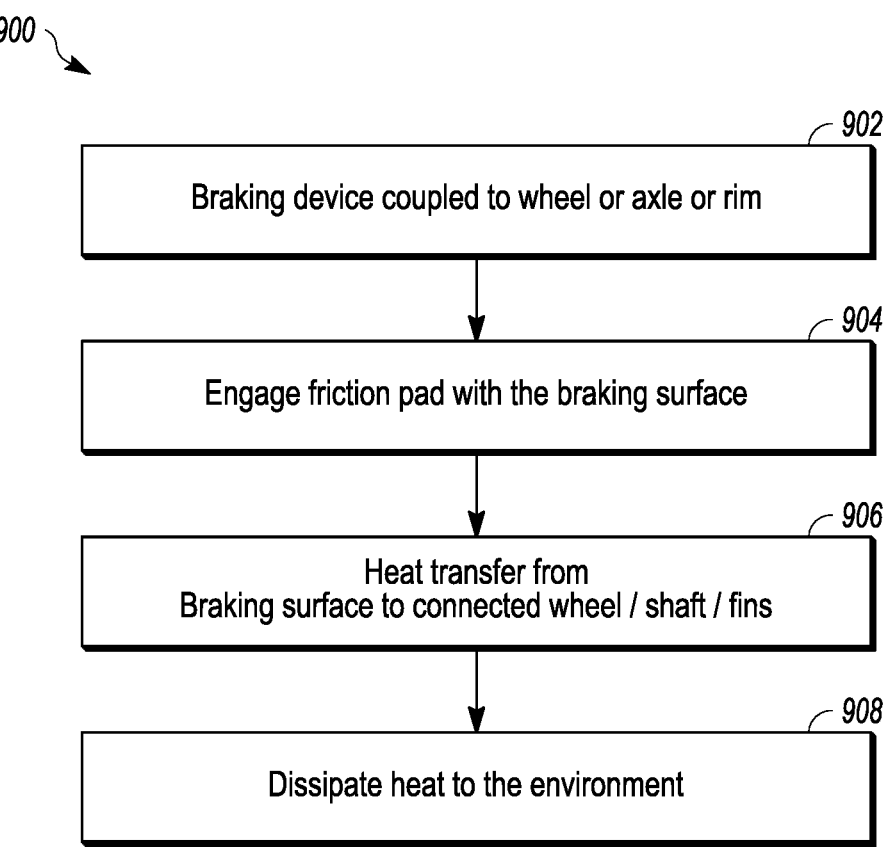
FIG. 9 illustrates a schematic flow block diagram of a method of cooling a brake assembly.

FIG. 9 illustrates a schematic flow block diagram of a method of cooling a brake assembly 900. In one example the brake assembly is the brake assembly of any of the brake assemblies, or includes any of the thermal management devices of previous Figures.

At step 902, a braking device is coupled to a wheel, axle, or rim. The braking device may include blades that may be coupled with the one or both of the brake disc or the wheel hub. In one example, the blades are circumferentially spaced apart from each other around the wheel hub. In another example, the blades are coupled with the one or both of the brake disc or the wheel hub with the blades one or more of positioned or shaped to increase an airflow from outside of the brake disc and the vehicle wheel to locations between the brake disc and the vehicle wheel relative to the blades not being positioned between the brake disc and the wheel hub. In examples, the blades may be concave, convex, arcuate, or the like.

At step 904, a friction pad engages a braking surface. The engagement of the friction pad to the braking surface causes friction forces that generate heat during the braking process.

At step 906, heat transfers from the braking surface to wheel or axle, and then to the plurality of blades that are spaced around the wheel hub. In one example, the wheel and braking surface may be made of a first material while the blades are made of a second material that facilitates the conduction of heat from the braking surface and wheel/axle to the plurality of blades. In addition, because of the shape of each blade, an increased surface area is provided for dissipating the heat.

At step 908, heat is dissipated into the environment. The heat may dissipate from the blades, where the shape of the blade may be arcuate, causing air flow over the blades the facilitates the transfer of heat from the blades to the environments. In this manner, the blades may be one or more of positioned or shaped to increase an airflow from outside of the brake disc and the vehicle wheel to locations between the brake disc and the vehicle wheel relative to the blades not being positioned between the brake disc and the wheel hub. Consequently, by adding the blades at the interface between the brake disc and the wheel and about the wheel hub of the wheel, heat transfer caused from braking friction is efficiently transferred from the brake disc and wheel into the environment. As a result, wear on the brake disc and wheel is reduced, enhancing performance and life of the brake assembly.

In one or more embodiments, a thermal management device may be provided. The thermal management device may include plural blades configured to be disposed between a brake disc and a wheel hub. The blades may be circumferentially spaced apart from each other around the wheel hub, the blades one or more of positioned or shaped to increase an airflow from outside of the brake disc and the vehicle wheel to locations between the brake disc and the vehicle wheel relative to the blades not being positioned between the brake disc and the wheel hub.

Optionally, the blades may extend throughout a length of a crevice between the vehicle wheel and the brake disc. In one aspect, the blades may contact one or both of a radially inner surface of the brake disc or a radially outer surface of the wheel hub. In another aspect, the blades may contact only one of a radially inner surface of the brake disc or a radially outer surface of the wheel hub. In yet another aspect, the blades may be planar bodies oriented at angles that intersect each other at a center of the wheel hub. In one example, the blades may be planar bodies oriented along radial planes that radially extend from a center axis of the wheel hub. Alternatively, the blades may be planar bodies oriented along transverse planes that are transverse to a center axis of the wheel hub. In another example, the blades may be planar bodies oriented along planes that are oriented at different angles relative to a center axis of the wheel hub. In another alternative embodiment, the blades may also be non-planar bodies.

Optionally, the blades may have a common thickness. Alternatively, the blades have different thicknesses. In one aspect, one or more of the blades may have a thickness that varies along a length of the one or more of the blades. In another aspect, the blades may be circumferentially spaced apart from each other by a common circumferential distance around the wheel hub. In yet another aspect, the blades may be circumferentially spaced apart from each other by different circumferential distances around the wheel hub. In one example, the blades may be biased toward each other between pressure sides and suction sides of the blades. In another example, the blades may be formed from a different material than the vehicle wheel. In yet another example, the blades and the vehicle wheel may be formed from a common material.

Optionally, the thermal management device may also include a brake disc having a body oriented transverse to a center axis of the wheel hub. The brake disc may also include protruding fins that face an axially oriented brake surface of the wheel, the protruding fins of the brake disc formed from a first material, the body of the brake disc formed from a second material that is different from the first material. In one aspect, one or both of the body or the protruding fins of the brake disc may include an insert formed from an insert material that differs from one or both of the first material of the protruding fins of the brake disc or the second material of the body of the brake disc. In another aspect, the body of the brake disc may include an insert formed from an insert material that differs from the second material of the body of the brake disc. In yet another aspect, the protruding fins of the brake disc may include inserts formed from an insert material that differs from first material of the protruding fins. In one example, the protruding fins of the brake disc, the body of the brake disc, the vehicle wheel include inserts formed from an insert material that differs from the first material of the protruding fins, the second material of the brake disc and a third material of the vehicle wheel. In another example, the brake disc may be mounted to a shaft connected with the vehicle wheel, the brake disc including opposing plates with the protruding fins disposed between the plates. In yet another example the blades may be separate from one or both of the brake disc and a shaft coupled with the vehicle wheel such that the blades may rotate around the shaft or relative to the vehicle wheel at a first rotational speed that differs from a second rotational speed at which the brake disc or the shaft rotates.

In one or more embodiments a thermal management device may be provided that may include a brake disc having a body that includes a wheel-facing surface and an opposite surface, the wheel-facing surface including protruding fins positioned to engage a vehicle wheel between a wheel hub and an outer circumferential surface of the vehicle wheel that engages a surface on which the vehicle wheel rolls. In addition, the thermal management device may include one or more of: (a) the body of the brake disc is formed from a first material, the protruding fins are formed from a second material, and the first material is different from the second material; (b) the body of the brake disc is formed from the first material and the body includes one or more body inserts formed from a third material; (c) the protruding fins are formed from the second material and the protruding fins include one or more fin inserts formed from the third material; (d) the body of the brake disc is formed from the first material and the body includes the one or more body inserts, the protruding fins are formed from the second material and the protruding fins include the one or more fin inserts, and the one or more body inserts and the one or more fin inserts are formed from the third material; (e) the body of the brake disc is formed from the first material and the body includes the one or more body inserts formed from the third material, the protruding fins are formed from the second material and the protruding fins include the one or more fin inserts formed from a fourth material, and the first material, the second material, the third material, and the fourth material are different materials; or (f) the body of the vehicle wheel is formed from the first material and the body includes the one or more wheel inserts formed from a sixth material, the protruding fins are formed from the second material and the protruding fins include the one or more fin inserts formed from a fifth material, the body of the brake disc is formed from the third material and include inserts formed from a fourth material, and the first material, the second material, the third material, the fourth material, the fifth material and the sixth material are different materials.

Optionally, the body of the brake disc may be formed from the first material, the protruding fins may be formed from the second material, and the first material may be different from the second material. In one aspect, the body of the brake disc may be formed from the first material and the body may include the one or more body inserts formed from the third material. In another aspect, the protruding fins may be formed from the second material and the protruding fins may include one or more fin inserts formed from the third material. In yet another aspect, the body of the brake disc may be formed from the first material and the body may include the one or more body inserts. The protruding fins may be formed from the second material and the protruding fins may include the one or more fin inserts, and the one or more body inserts, and the one or more fin inserts are formed from the third material. In one example, the body of the brake disc may be formed from the first material and the body may include the one or more body inserts formed from the third material. The protruding fins may be formed from the second material and the protruding fins may include the one or more fin inserts formed from the fourth material. In addition, the first material, the second material, the third material, and the fourth material may be different materials. In another example, the body of the vehicle wheel may be formed from the first material and the body may include the one or more wheel inserts formed from a sixth material. The protruding fins may be formed from the second material and the protruding fins may include the one or more fin inserts formed from a fifth material, the body of the brake disc may be formed from the third material and may include inserts formed from a fourth material. In addition, the first material, the second material, the third material, the fourth material, the fifth material and the sixth material may be different materials.

Optionally, the thermal management device also includes plural blades that may be disposed between the brake disc and the wheel hub, and the blades may be circumferentially spaced apart from each other around the wheel hub. In one aspect, the blades may be one or more of positioned or shaped to increase an airflow from outside of the brake disc and the vehicle wheel to locations between the brake disc and the vehicle wheel relative to the blades not being positioned between the brake disc and the wheel hub.

In one or more embodiments, a method may be provided that includes coupling plural blades with one or both of a brake disc or a wheel hub. The blades may be coupled with the one or both of the brake disc or the wheel hub with the blades circumferentially spaced apart from each other around the wheel hub. The blades may also be coupled with the one or both of the brake disc or the wheel hub with the blades one or more of positioned or shaped to increase an airflow from outside of the brake disc and the vehicle wheel to locations between the brake disc and the vehicle wheel relative to the blades not being positioned between the brake disc and the wheel hub.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:
1. A thermal management device comprising:
blades configured to be disposed between a brake disc and a wheel hub, the blades circumferentially spaced apart from each other around the wheel hub, the blades one or more of positioned or shaped to direct an airflow from outside of the brake disc and a vehicle wheel to locations between the brake disc and the vehicle wheel, wherein the blades radially extend from the wheel hub to a radially inner surface of the brake disk and the blades are spaced with gaps therebetween, and
wherein the blades are coupled to the wheel hub and separate from the brake disc and a shaft coupled with the vehicle wheel.
2. The thermal management device of claim 1, wherein the blades extend throughout a length of a crevice between the vehicle wheel and the brake disc.
3. The thermal management device of claim 1, wherein the blades have a common thickness.

4. The thermal management device of claim 1, wherein one or more of the blades has a thickness that varies along a length of the one or more of the blades.

5. The thermal management device of claim 1, wherein the blades are circumferentially spaced apart from each other by a common circumferential distance around the wheel hub.

6. The thermal management device of claim 1, wherein the blades are biased toward each other near the wheel hub.

7. The thermal management device of claim 1, wherein the blades are formed from a different material than the vehicle wheel.

8. The thermal management device of claim 1, further comprising the brake disc, the brake disc including a body oriented transverse to a center axis of the wheel hub, the brake disc including protruding fins that face an axially oriented brake surface of the vehicle wheel, the protruding fins of the brake disc formed from a first material, the body of the brake disc formed from a second material that is different from the first material.

9. The thermal management device of claim 8, wherein the brake disc is configured to be mounted to a shaft connected with the vehicle wheel, the brake disc including opposing plates with the protruding fins disposed between the plates.

10. A thermal management device comprising:
a brake disc having a body that includes a wheel-facing surface and an opposite surface, the wheel-facing surface including protruding fins positioned to engage a vehicle wheel between a wheel hub and an outer circumferential surface of the vehicle wheel that engages a surface on which the vehicle wheel rolls, and
a plurality of blades spaced with gaps therebetween disposed between an outer rim of the brake disc and an inner surface of the wheel,
wherein the blades are coupled to the wheel hub and separate from the brake disc and a shaft coupled with the vehicle wheel, and
wherein one or more of:
  (a) the body of the brake disc is formed from a first material, and the protruding fins are formed from a second material
  (b) the body of the vehicle wheel is formed from the first material, the protruding fins are formed from the second material, and the body of the brake disc is formed from a third material.

11. The thermal management device of claim 10, wherein the body of the brake disc is formed from the first material, the protruding fins are formed from the second material, and the first material is different from the second material.

12. The thermal management device of claim 10, wherein the body of the vehicle wheel is formed from the first material, the brake disc is formed from the third material, the protruding fins are formed from the second material, and wherein the first material, the second material, and the third material are all different materials.

* * * * *